United States Patent [19]
Liao

[11] Patent Number: 5,379,172
[45] Date of Patent: Jan. 3, 1995

[54] LAMINATED LEG FOR THIN FILM MAGNETIC TRANSDUCER

[75] Inventor: Simon H. Liao, Santa Barbara, Calif.

[73] Assignee: Seagate Technology, Inc., Scotts Valley, Calif.

[21] Appl. No.: 585,005

[22] Filed: Sep. 19, 1990

[51] Int. Cl.⁶ .................. G11B 5/147; H01F 10/00
[52] U.S. Cl. .................. 360/126; 428/336; 428/692
[58] Field of Search ............ 360/125, 126, 119, 121, 360/122, 113; 428/336, 611, 655, 668, 678–681, 692, 693, 900; 427/131, 132

[56] References Cited

U.S. PATENT DOCUMENTS

| | | | |
|---|---|---|---|
| 3,953,654 | 4/1976 | Feldstein | 360/131 |
| 4,049,522 | 9/1977 | Ainslie et al. | 204/192 M |
| 4,079,430 | 3/1978 | Fujishima et al. | 360/125 |
| 4,210,946 | 7/1980 | Iwasaki et al. | 360/131 |
| 4,242,710 | 12/1980 | Hempstead et al. | 360/113 |
| 4,407,901 | 10/1983 | Miyatsuka et al. | 360/135 |
| 4,489,357 | 12/1984 | Van Ooijen et al. | 360/113 |
| 4,539,616 | 9/1985 | Yuito et al. | 360/125 |
| 4,589,042 | 5/1986 | Anderson et al. | 360/125 |
| 4,631,613 | 12/1986 | French | 360/125 |
| 4,652,954 | 3/1987 | Church | 360/120 |
| 4,670,972 | 6/1987 | Sakakima | 29/603 |
| 4,745,509 | 5/1988 | Watanabe et al. | 360/125 |
| 4,780,781 | 10/1988 | Sano et al. | 360/126 |
| 4,799,118 | 1/1989 | Yamada et al. | 360/126 |
| 4,843,507 | 6/1989 | Schewe et al. | 360/119 |
| 5,029,032 | 7/1991 | Yamada et al. | 360/126 |
| 5,032,945 | 7/1991 | Argyle et al. | 360/125 |
| 5,080,948 | 1/1992 | Morita et al. | 360/135 |
| 5,089,334 | 2/1992 | Mallary et al. | 360/113 |
| 5,108,837 | 4/1992 | Mallary | 360/126 |
| 5,155,644 | 10/1992 | Kira et al. | 360/113 |

OTHER PUBLICATIONS

Simon H. Liao; Electrodeposition Of Magnetic Materials For Thin-Film Heads; Jan. 1990; IEEE Transactions of Magnetics, vol. 26, No. 1; pp. 328–332.

Jean-Pierre Lazzari and Igor Melnick; Integrated Magnetic Recording Heads; Mar. 1971; IEEE Transactions on Magnetics, vol. MAG-7, No. 1; pp. 146–150.

R. E. Jones, Jr.; Domain Effects In The Thin Film Head; 1979; IEEE Transactions on Magnetics, MAG-15, No. 6; pp. 1619–1621.

John C. Slonczewski, Bojan Petek, and Bernell E. Argyle; Micromagnetics Of Laminated Permalloy Films; May 1988; IEEE Transactions on Magnetics, vol. 24, No. 3.; pp. 2045–2053.

Primary Examiner—Robert S. Tupper
Assistant Examiner—Jefferson Evans
Attorney, Agent, or Firm—Kinney & Lange

[57] ABSTRACT

A laminated thin film magnetic head having nickel phosphorus layers sandwiched between layers of nickel iron. The nickel iron layers preferably have zero magnetostriction. The nickel phosphorus layer may comprise NiPX where X is one or more of the following: tungsten, boron, copper or molybdenum. Multiple laminations may be employed.

20 Claims, 21 Drawing Sheets

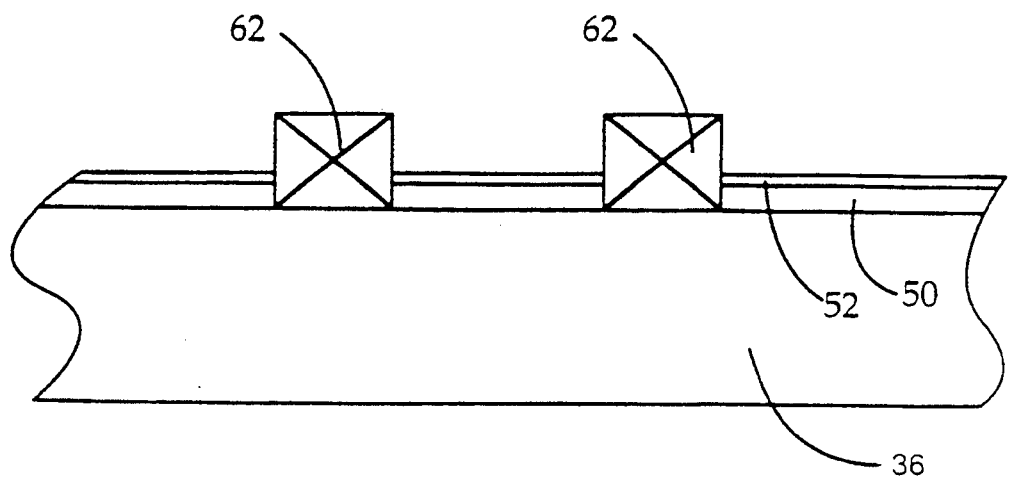
_Fig. 19_
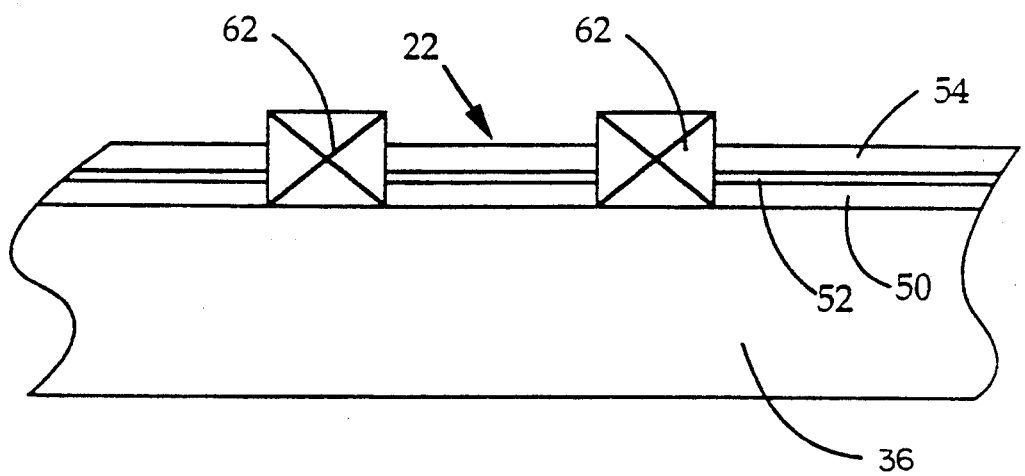
_Fig. 20_

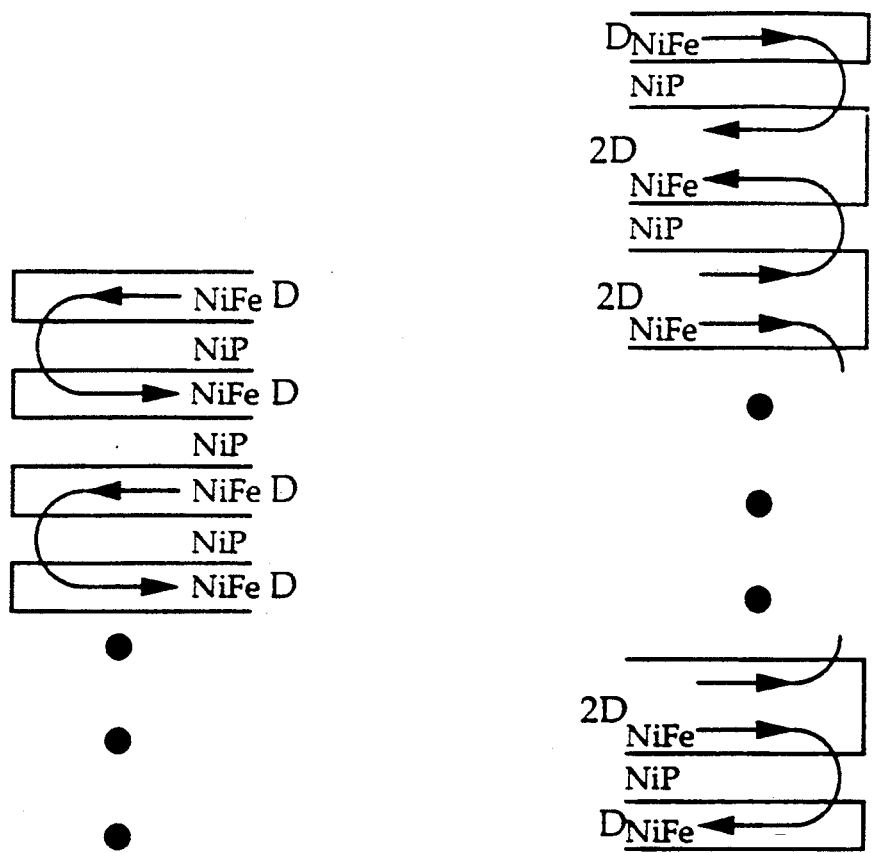
*Fig. 24*   *Fig. 25*

LAMINATED LEG FOR THIN FILM MAGNETIC TRANSDUCER

BACKGROUND OF THE INVENTION

1. Field of the Invention

The present invention relates to thin film magnetic read/write heads. In particular, the invention relates to thin film magnetic heads having laminated thin film layers.

2. Description of the Prior Art

Thin film magnetic read/write heads are used for magnetically reading and writing information on a magnetic storage medium such as a magnetic disk or a magnetic tape. As data storage needs have risen, high levels of information storage densities on the magnetic storage medium have become increasingly desireable. Increased storage densities require magnetic read/write heads that provide a strong writing field in relation to the applied writing current and high permeability for large signal output which may be achieved by making the anisotropy field ($H_k$) as small as possible thereby increasing the permeability ($\mu$). Increased $\mu$ also results in increased sensitivity when information is read from the magnetic storage medium. Smaller coercivity ($H_c$) in a read/write magnetic head is also desirable. The anisotropy, $H_k$, permeability, $\mu$, and coercivity $H_c$, however, are to limited in their ability to improve head performance. It would be desireable to limit the noise present in the film heads using other methods.

Magnetic domains in thin film read/write heads are a noise source. Undesired domain rotation and domain wall motion may result in noise on the output signal of the thin film head. This noise has been reduced by using copper and gold lamination layers whereby only a single magnetic domain is formed. It would be desireable to decrease the noise present in magnetic thin film heads due to instability in the magnetic domains using lamination layers other than copper or gold which would be more suited for use in the fabrication of thin film heads.

SUMMARY OF THE INVENTION

The present invention reduces noise in thin film magnetic heads due to domain instability without degrading the material's coercivity, ($H_c$), anisotropy field, ($H_k$), saturation magnetization, ($4\pi M_s$), or permeability, ($\mu$). Increased magnetic domain stability is provided by reducing the number of magnetic domains in the thin film core. A laminated thin film core in which a layer of nickel phosphorus (NIP) is sandwiched between layers of nickel iron (NiFe) to produce a thin film head having a single magnetic domain is taught. Multiple laminated layers of nickel phosphorus may be deposited. As alternatives, the nickel phosphorus layer may comprise one or more layers of NiPX where X is one or more of the following: tungsten, boron, copper or molybdenum.

The nickel phosphorus lamination layer is deposited in a wet process well-suited for use during fabrication of thin film magnetic read/write heads. The layers may be deposited without "activating" the previous layer because the nickel iron layer and lamination layer are auto-catalytic. This means that each layer directly bonds to the previous layer without any intermediary steps. The nickel iron layers preferably have zero magnetostriction (such as 83NiFe17). The zero magnetostriction NiFe is less sensitive to stress and more stable in a single domain state.

Nickel phosphorus provides an improved lamination material over copper or gold because it is easily incorporated into the fabrication process.

BRIEF DESCRIPTION OF THE DRAWINGS

FIG. 19 is a cross sectional view of the structure of FIG. 18 following deposition of a subsequent lamination layer.

FIG. 20 is a cross sectional view of the structure of FIG. 19 following deposition of a subsequent lamination layer.

FIGS. 24 and 25 show two lamination configurations.

DETAILED DESCRIPTION OF THE PREFERRED EMBODIMENT

Figure 1:
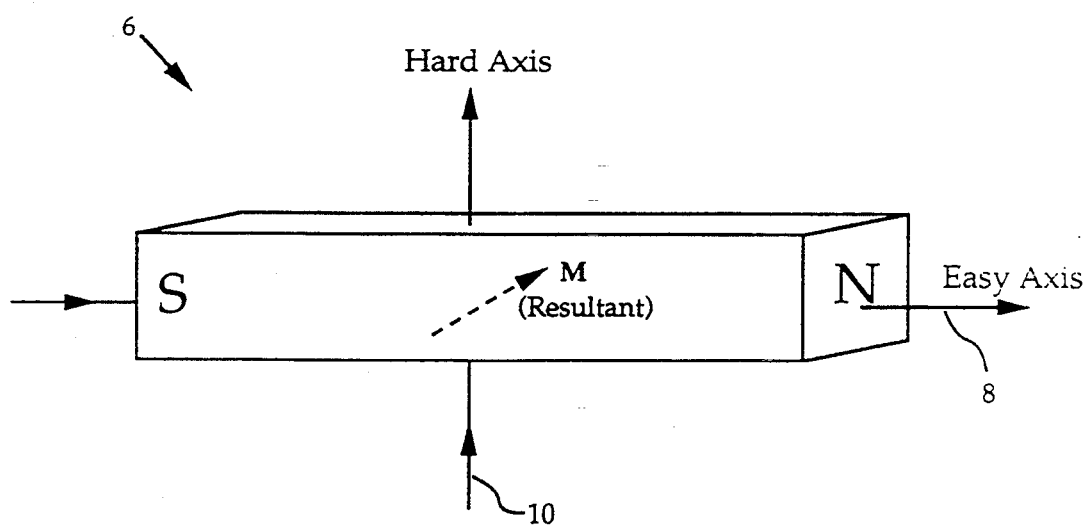
FIG. 1 is a plan view of a bar magnet.

In order to appreciate the improved magnetic characteristics achieved with the laminated thin film head of the present invention, a general discussion of these magnetic characteristics will be helpful. FIGS. 1–5 and the following discussion describes the meaning and significance of easy axis, anisotropy field ($H_k$), permeability ($\mu$), coercivity ($H_c$) and magnetization (M). For purposes of illustration, a bar magnet 6 is shown in FIG. 1. Also shown in FIG. 1 are arrows 8 and 10 indicating what is known as the easy axis and the hard axis, respectively, of bar magnet 6. The easy axis refers to the preferred direction of the magnetization (M) of a magnetic material in a "relaxed" state. In a magnet, the easy axis is parallel with the axis of the poles. The hard axis, on the other hand, refers to a direction perpendicular to the easy axis, as shown in FIG. 1. When a magnetizing field H is applied to a magnetic material, the magnetization vector M of the material tends to deflect in the direction of the applied field H. By applying a sufficiently large magnetization field H in a direction other than the direction of the magnetic material's easy axis, the material's magnetization vector M is deflected away from the direction preferred in the relaxed state, parallel to the easy axis as shown by the vector M (Resultant) in FIG. 1.

Figure 2:
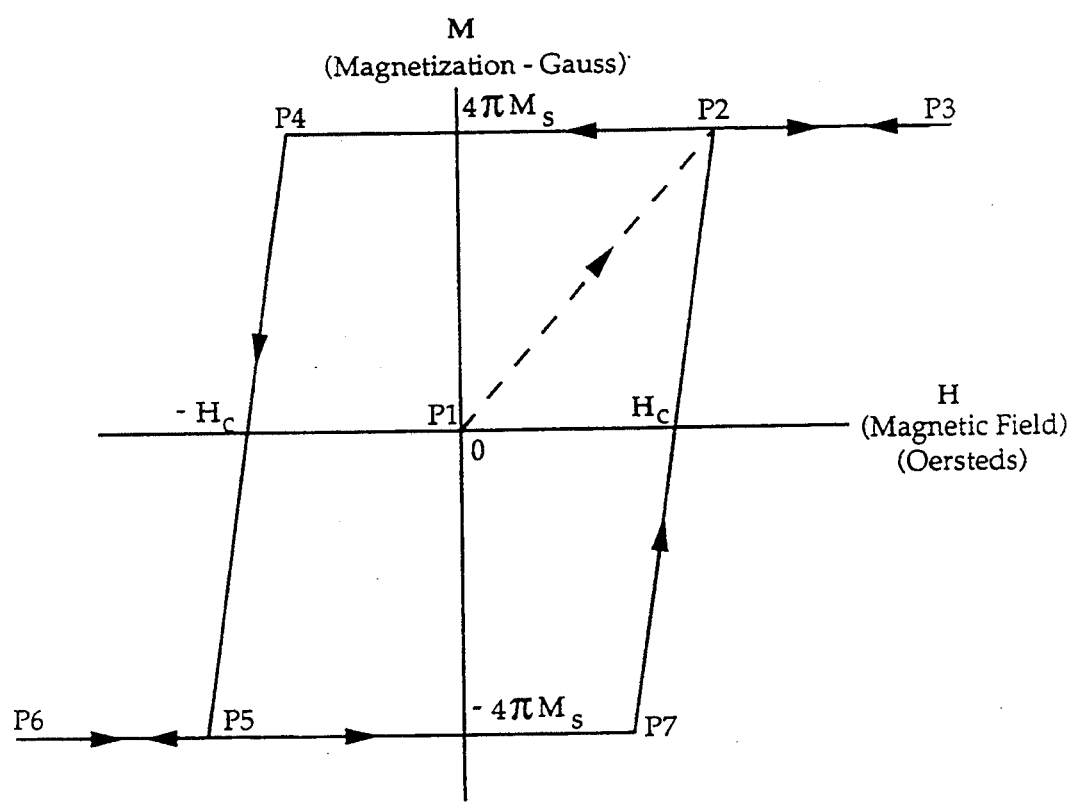
FIG. 2 is graph of magnetization versus applied magnetic field in the easy axis of a magnetic material.

When an alternating magnetic field H is applied to a magnetic material along that material's easy axis, a graph of magnetization M versus applied magnetic field H forms a hysteresis loop as shown in FIG. 2. The magnetization M is shown as $4\pi M$ in units of Gauss. H, the applied magnetic field, is shown in units of Oersteds.

Starting from the point labelled P1 in FIG. 2, as a magnetic field H (in the easy axis direction) is applied to the magnetic material, the magnetization M follows the dashed line to the point labelled P2 in FIG. 2. Once the material reaches the point P2 in FIG. 2, the material is saturated and any additional magnetic field H applied to the material results in no further increase in the material's magnetization. Further increase of applied H moves the plot to P3 in FIG. 2. This saturation magnetization value is $4\pi M_s$ in FIG. 2.

As the level of the applied magnetic field H is decreased and the direction of its vector is reversed, the material follows the path from point P3 through P2 to the point labelled P4 in FIG. 2. The material's magnetization does not change from its saturated value of $4\pi M_s$. A further increase of the applied magnetic field H in the reverse direction causes the magnetization M within the magnetic material to begin to decrease following the path from point P4 to the point labelled P5 passing through the point labelled $-H_c$ on the hysteresis loop shown in FIG. 2. Once point P5 in FIG. 2 is reached, further increase of the magnetic field H (in the reverse direction) results in no further increase in the magnetization of the material and the material is once again saturated at the value shown as $-4\pi M_s$ in FIG. 2. Such increase in the strength of the applied magnetic field H moves the plot from point P5 to the point labelled P6 in FIG. 2.

As the applied magnetic field H is increased from its value at point P6 through point P5 and zero and to the point labelled P7 in FIG. 2, the magnetization of the material does not change from its saturated value of $-4\pi M_s$. Additional increase of the magnetic field H causes the material's magnetization to follow the path from point P7 to point P2 through $H_c$ on the hysteresis loop. By continuing to vary the applied magnetic field H, the material may be made to repeatedly follow the hysteresis path of FIG. 2.

The points labelled $H_c$ and $-H_c$ indicate the coercive force, or coercivity of the magnetic material. The area of the hysteresis loop corresponds to the energy loss during one hysteresis cycle. Hysteresis loss is the energy lost in the form of heat in overcoming the friction encountered during domain wall motion and domain rotation. In magnetic read/write heads, it is desirable to have a large saturation magnetization $4\pi M_s$ and a small coercivity $H_c$ such that the shape of the hysteresis loop is generally tall and thin. By employing a laminated core, Barkhausen noise is reduced without decreasing the saturation magnetization.

Figure 3:
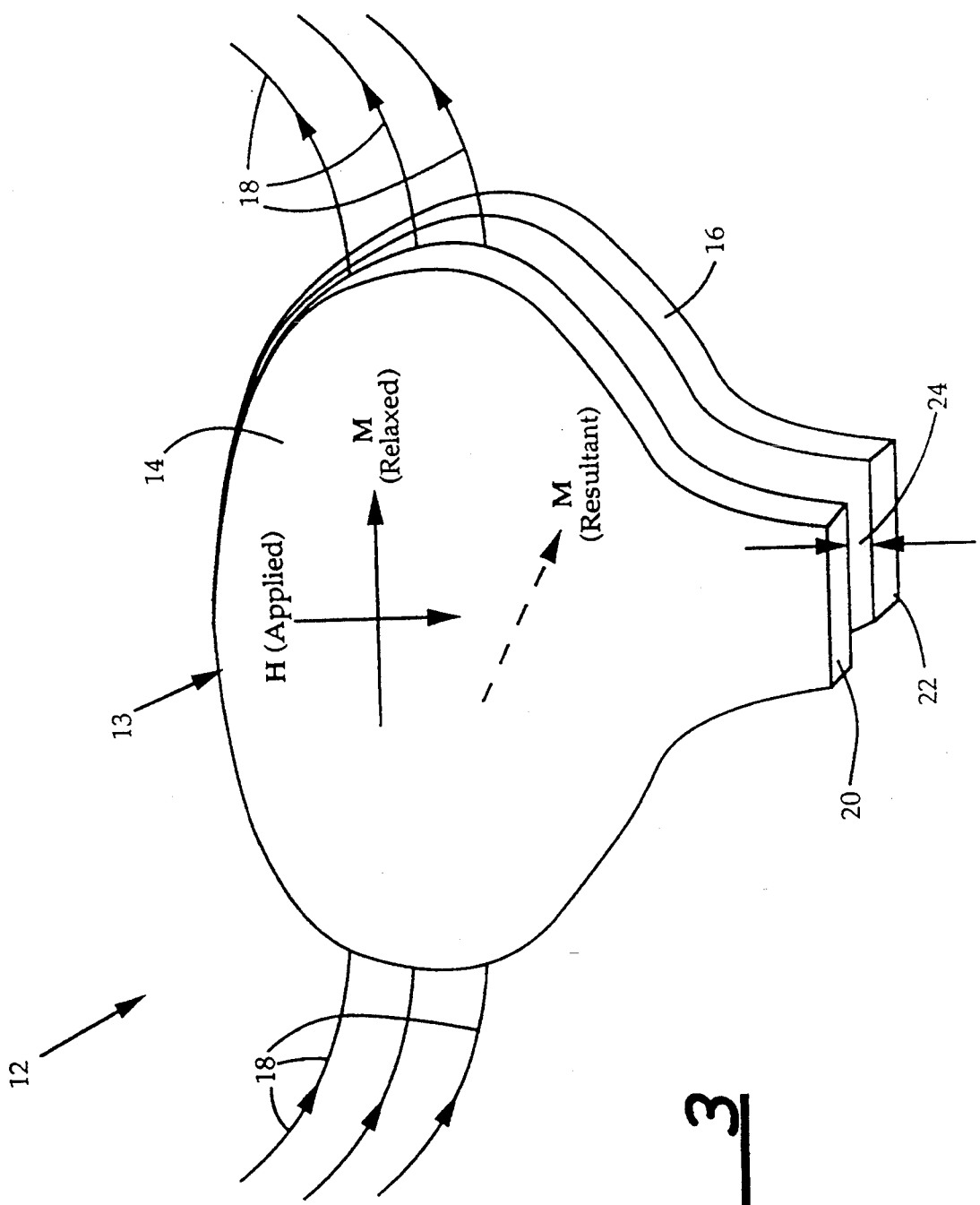
FIG. 3 is a plan view of a thin film magnetic read/write head.

FIG. 3 diagrammatically shows a typical thin film head 12 comprising core 13 including upper pole piece 14 and lower pole piece 16. Conductors 18 extend through thin film head 12 and are sandwiched between upper pole piece 14 and lower pole piece 16. Upper pole piece 14 includes upper pole tip 20 while lower pole piece 16 includes lower pole tip 22. Gap 24 is shown as formed between upper pole tip 20 and lower pole tip 22. Typically, alumina fills gap 24. A magnetic storage medium (not shown) may be placed near gap 24 such that information may be written on or read from the medium.

Also shown in FIG. 3 is an arrow labelled H (Applied) indicating the direction of the applied magnetic field H and an arrow labelled M (Relaxed) indicating the magnetization M of the thin film head 12 in its relaxed state. In operation, a magnetic storage medium such as a magnetic disk or a magnetic tape moves in the region near gap 24 formed between upper pole tip 20 and lower pole tip 22. As electrical current is caused to flow in conductors 18 in the direction indicated, a magnetic field H will be applied to thin film head 12 in the direction shown by the arrow labelled H (Applied) in FIG. 4. This applied magnetic field causes the magnetization M of the material to change direction from the direction indicated by the arrow labelled M (Relaxed) to the direction indicated by the arrow formed by the dashed lined labelled M (Resultant). As the dashed line labelled M (Resultant) is deflected away from the easy axis in a direction toward gap 24 formed between upper pole tip 20 and lower pole tip 22 due to the applied magnetic field H from electrical current passing through conductors 18, upper pole tip 20 will become an increasingly strong north pole while lower pole tip 22 becomes a south pole. This causes a fringe field to form around gap 24 with a magnetic field vector having direction from upper pole tip 20 to lower pole tip 22.

In a similar manner, if the current through conductors 18 were reversed from the direction indicated in FIG. 3, upper pole tip 20 would become a south pole while lower pole tip 22 would become a north pole. This would cause a fringe field to form in gap 24 with a magnetic field in a direction from lower pole tip 22 to upper pole tip 20. Thus it is possible by modulating the flow of the electrical current through conductors 18 to modulate the magnetization of upper pole tip 20 and lower pole tip 22. Gap 24 between upper pole tip 20 and lower pole tip 22 causes a fringe field to extend beyond the region of gap 24. When a magnetic storage medium such as a magnetic disk or a magnetic tape is placed in this fringe field, information may be recorded by impressing a magnetic field upon the medium through the fringe field associated with thin film head 12. Similarly, magnetization patterns impressed upon a storage medium passing through the fringe field region of thin film head 12 cause an electrical current to flow through conductors 18 such that the stored information may be recovered.

Figure 4:
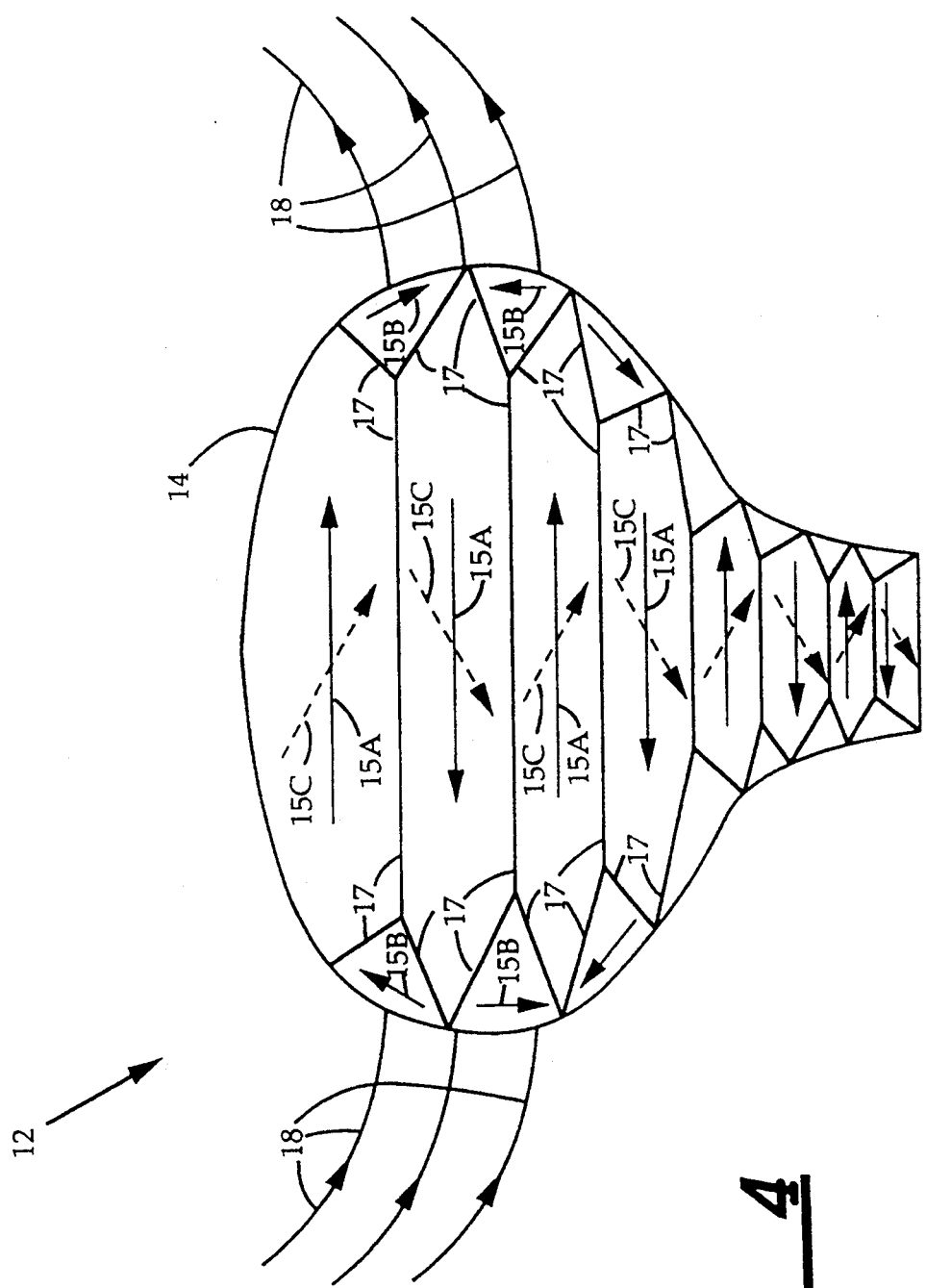
FIG. 4 is a top view of a thin film magnetic read/write head showing a magnetic domain pattern.

FIG. 4 shows thin film head 12 of FIG. 3 including arrows 15A, 15B and 15C indicating the direction of the magnetization vectors M in the magnetic domains across upper pole piece 14. Solid arrows 15A in FIG. 4 indicate the direction of a magnetic domain's easy axis. Lines 17 in FIG. 4 separating two adjacent magnetic domains indicate the domain walls. Solid arrows 15A show the direction of the magnetization vector M in the relaxed state of thin film head 12 along the easy axis of head 12. Small arrows 15B along the edge of upper pole piece 14 shown in FIG. 4 indicate the magnetization vector in the closure domains. Closure domains complete the magnetic circuit between adjacent opposing domains. As electrical current is caused to flow through conductors 18 in the direction indicated, the directions of the magnetization vector M of the domains in upper pole piece 14 are deflected away from the easy axis as shown by arrows 15C formed by the dashed lines. It is this deflection that causes north and south poles to form at upper pole tip 20 and lower pole tip 22, respectively.

Figure 5:
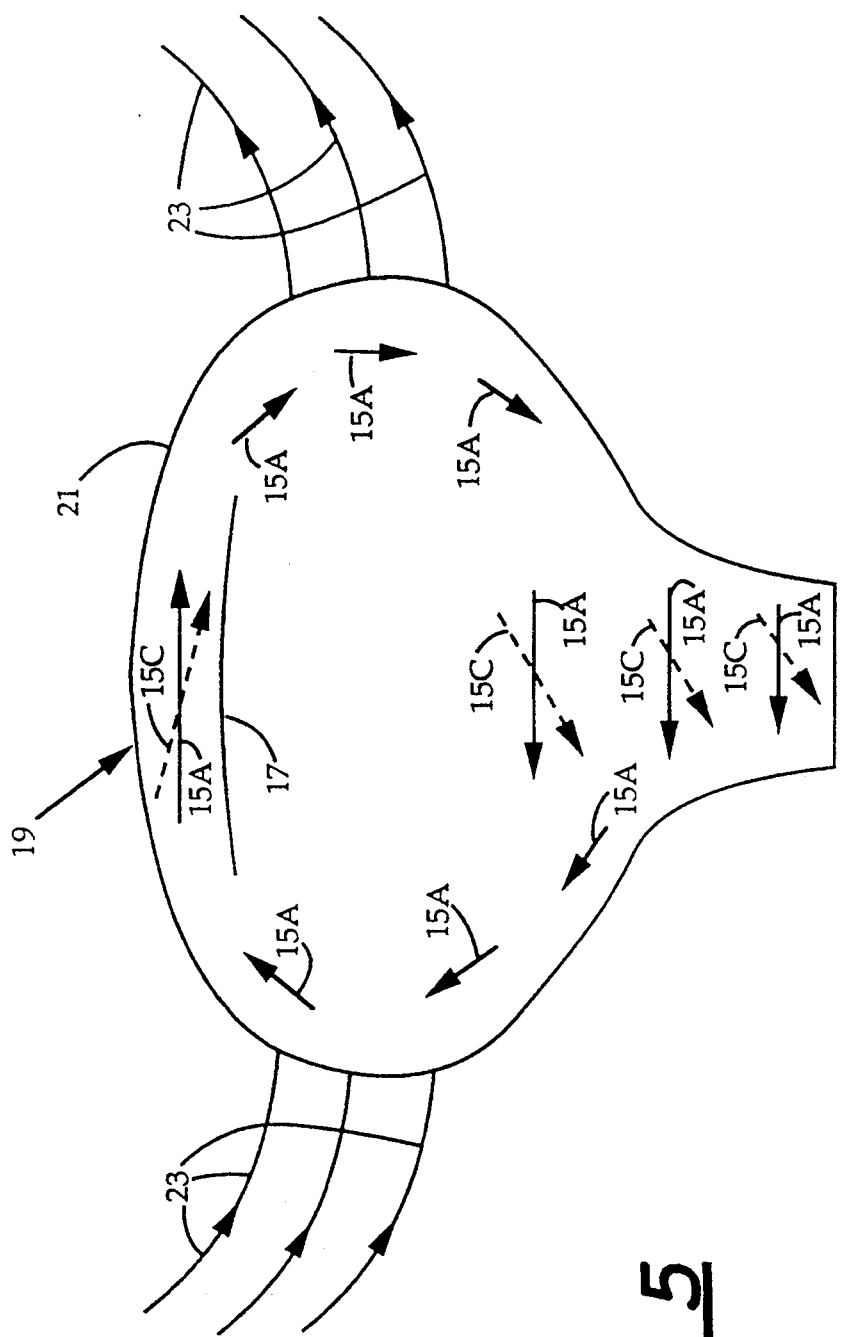
FIG. 5 is a top view of a thin film magnetic read/write head having a single magnetic domain.

In the present invention, domain wall jumping is limited by manufacturing a thin film magnetic read/write head having a reduced number of magnetic domains and their corresponding domain walls. FIG. 5 shows a thin film head 19 having an improved upper pole piece, laminated upper pole piece 21 in which there is a single magnetic domain. Solid arrows 15A shown in FIG. 5 again represent the direction of the relaxed magnetization of upper pole piece 15 along the easy axis. Laminated pole piece 21 has no closure domains. Instead, the magnetization vectors curve around the edge of pole piece 21. The dashed arrows represent the resultant magnetization M due to an electrical current applied to conductors 23 in the direction indicated. During the read and write operations, head 19 in FIG. 5 having laminated pole piece 21 operates in a manner similar to that described above for head 12 in FIG. 4 having upper pole piece 14 with multiple magnetic domains.

The present invention relates to an improved lamination for forming upper and lower pole pieces in thin film head 19.

Figure 6:
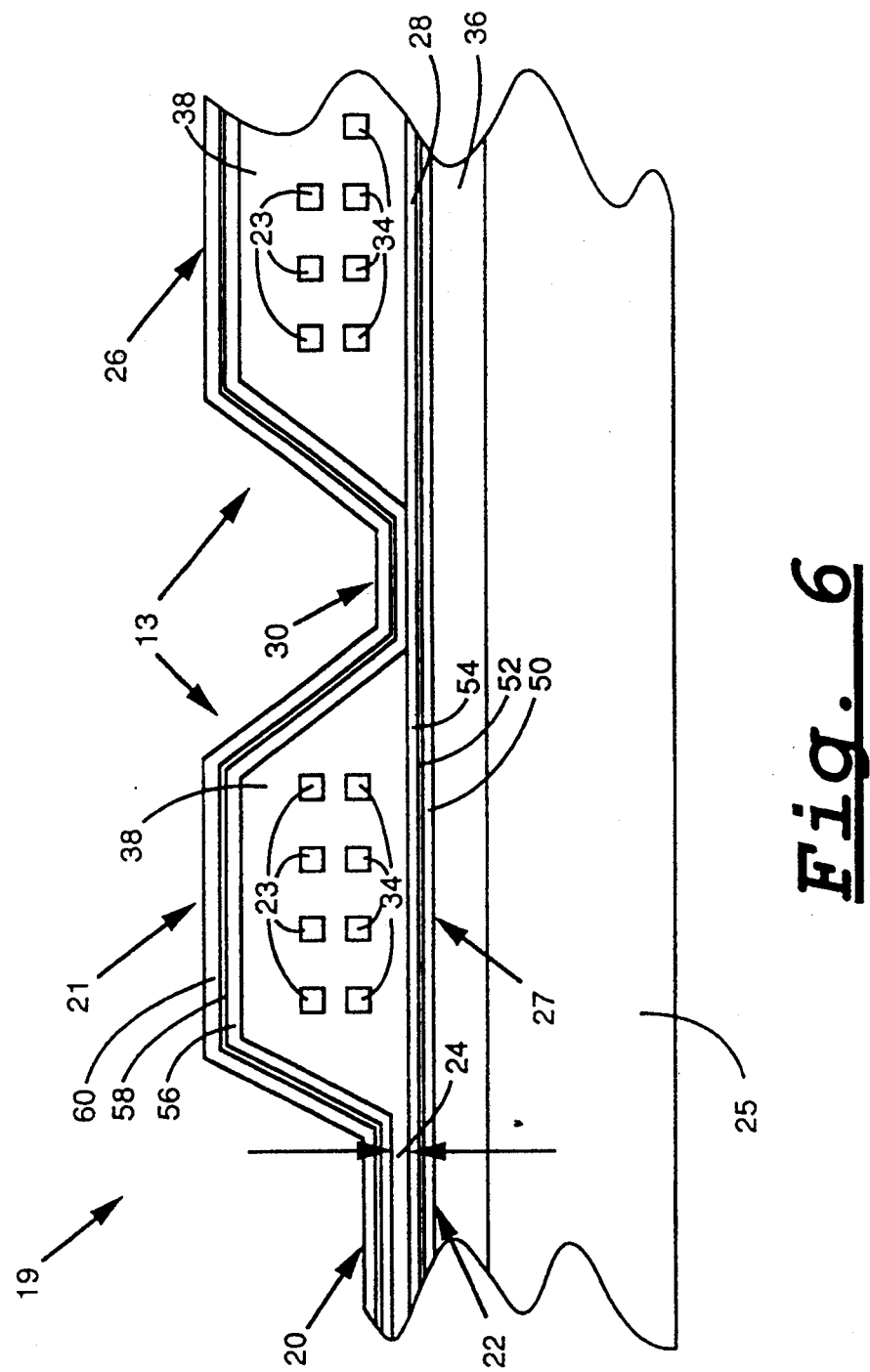
FIG. 6 is a cross sectional view of a laminated thin film magnetic read/write head.

FIG. 6 shows a cross sectional view of a laminated thin film magnetic head 19 of FIG. 5. Thin film head 19 includes base or "flyer" substrate 25 and pole pieces or core 13. Flyer substrate 25 may comprise, for example, ALSIMAG material. Core 13 comprises laminated upper pole piece 21 and laminated lower pole piece 27. Laminated upper pole piece and lower pole piece portions 21 and 27 include upper pole tip 20 and lower pole tip 22, respectively, between which gap 24 is formed. Core 13 also includes laminated rear upper portion 26 and laminated rear lower portion 28. Upper pole piece and lower pole piece 21 and 27 and rear upper and lower portions 26 and 28 of core 13 meet at center area or "via" 30 in FIG. 6 (not shown in FIG. 5). The pole pieces of core 13 are laminated in accordance with the present invention.

Also shown in FIG. 6 are lamination layers 50–60. Lamination layer 50 comprises nickel iron, layer 52 comprises nickel phosphorus, and layer 54 comprises nickel iron. Lamination layer 56 comprises nickel iron, layer 58 comprises nickel phosphorus and layer 60 comprises nickel iron. The deposition techniques used in forming these lamination layers are described below in more detail.

Thin film head 19 of FIG. 6 uses two core windings formed by conductors 23 and 34. Conductors 23 and 34 are formed in a coil around the center or via 30 of core 13 with a portion of the wrapping being sandwiched between laminated upper pole piece and laminated lower pole piece 21 and 27 of core 13 and a portion of the wrapping sandwiched between laminated rear upper and lower portions 26 and 28 of core 13. Core 13 is separated from substrate 25 by base coat 36. Typically, base coat 36 is an insulator such as alumina (Al$_2$O$_3$). The area between laminated upper pole piece 21 and lower pole piece is filled with an insulating material 38. Typically, insulating material 38 is photoresist. Gap 24 between upper pole tip 20 and lower pole tip 22 is filled with alumina, Al$_2$O$_3$. Insulating material 38 is also sandwiched between rear upper and lower portions 26 and 28 of core 13.

During fabrication, multiple heads similar to thin film head 19 may be deposited across the entire surface of base substrate 25. After the layers of thin film head 19 are deposited as shown in FIG. 6, base substrate 25 upon which head 19 is formed is "diced" or sliced into many individual thin film heads, each carried by a portion of base substrate 25, such that upper and lower pole tips 20 and 22 and gap 24 are exposed. Gap 24 and pole tips 20 and 22 may then be lapped in a direction generally inward, toward the center of thin film head 19, to the desired throat dimensions. The lapping process is typically a grinding process in which the exposed portion of gap 24 is applied to a diamond slurry. Electrical contacts (not shown) are applied to conductors 23 and 34 of thin film head 19. The completed head may then be attached to some type of carrying fixture (not shown) for use in reading and writing data on a magnetic storage medium such as a computer disk.

In operation, the magnetic storage medium is placed near upper and lower pole tips 20 and 22 which form gap 24. During the read operation, the changing magnetic field due to the moving storage medium (not shown) impresses a magnetic field upon upper and lower pole tips 20 and 22 formed by laminated upper pole pieces and lower pole pieces 21 and 27 of core 13. This impressed field is carried around conductors 23 and 34 through laminated upper pole piece 21, via 30 and laminated lower pole piece 27 of core 13. This causes an electrical current to be induced in conductors 23 and 34. This electric current is representative of the magnetic field produced by the moving magnetic storage medium (not shown). During the write operation, an electric current is caused to flow in conductor 23 or conductor 34. This results in a magnetic field in core 13 which is applied to the storage medium (not shown) due to the fringing effect at gap 24 formed between upper and lower pole tips 20 and 22 of core 13.

Figure 7:
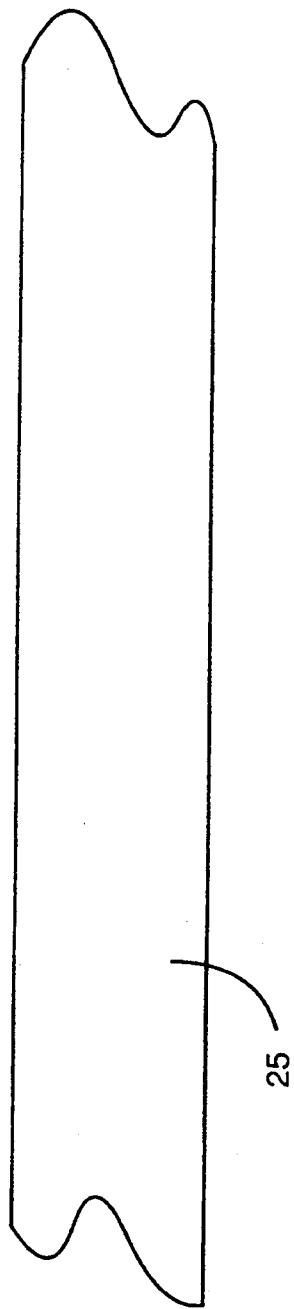
FIG. 7 is a cross sectional view of the substrate shown in FIG. 6.

The steps used in fabricating thin film magnetic head 12 of FIGS. 5 and 6 are shown individually in FIGS. 7–23. In the cross sectional view of FIG. 7, base substrate 25 is shown. Base substrate 25 is typically large relative to the dimensions of the thin film magnetic heads and is referred to as a "wafer." During the manufacturing process, many thin film heads such as thin film head 19 typically are fabricated upon base substrate 25. For this example, however, only the fabrication of single thin film magnetic head 19 is shown. Typically, base substrate 25 is made of an electrically conductive material, such as ALSIMAG.

Figure 8:
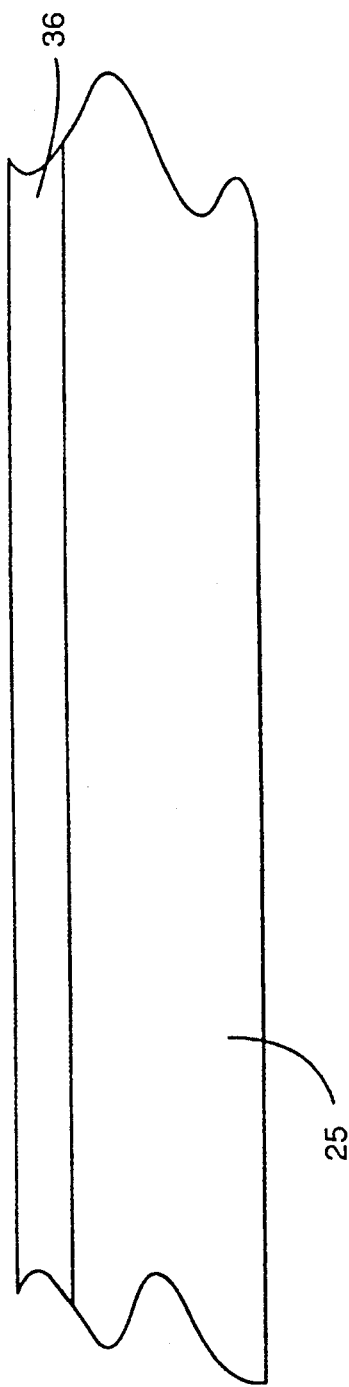
FIG. 8 is a cross sectional view of the substrate of FIG. 7 including a base coat layer.

A base coat layer 36 is deposited across the entire base substrate 25 as shown in FIG. 8. Base coat 36 is a nonconductive material, typically comprising alumina, Al$_2$O$_3$. Base coat 36 may be applied using sputtering techniques.

Figure 9:
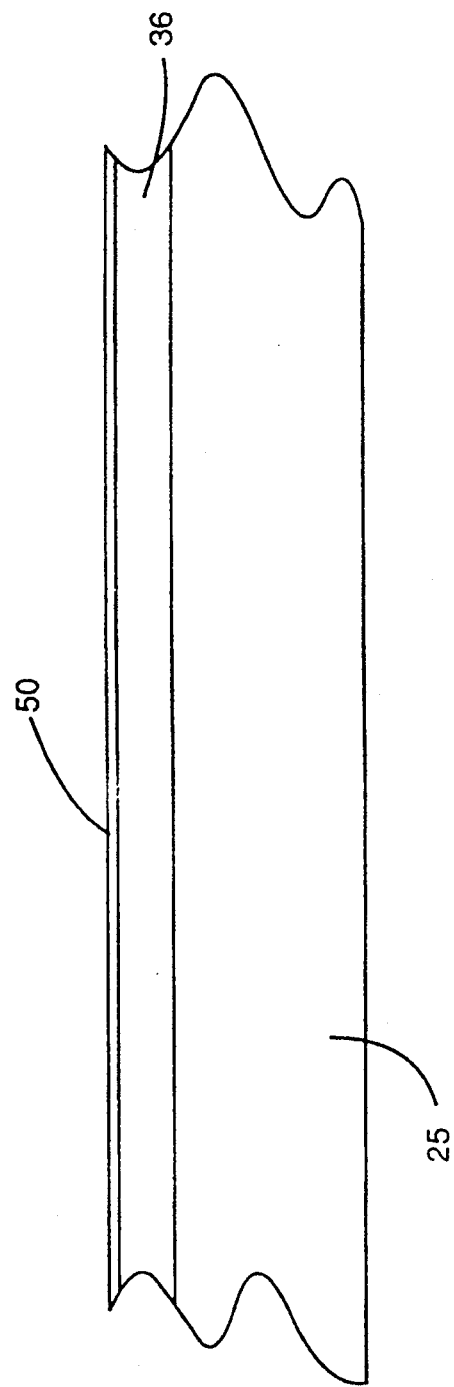
FIG. 9 is a cross sectional view of the structure of FIG. 8 including a lamination layer.

As shown in FIG. 9, thin film lamination layer 50 of magnetic material (NiFe) is applied across the surface of base coat 36 using a deposition process. This process is described below in more detail. Layer 50 forms a portion of lower pole piece 27 and a portion of lower rear portion 28 of core 13, as well as a portion of lower pole tip 22 and via 30 (as shown in FIG. 6). Layer 50 is of nickel iron (NiFe) and comprises a laminated layer of the laminated core of the present invention.

Figure 10:
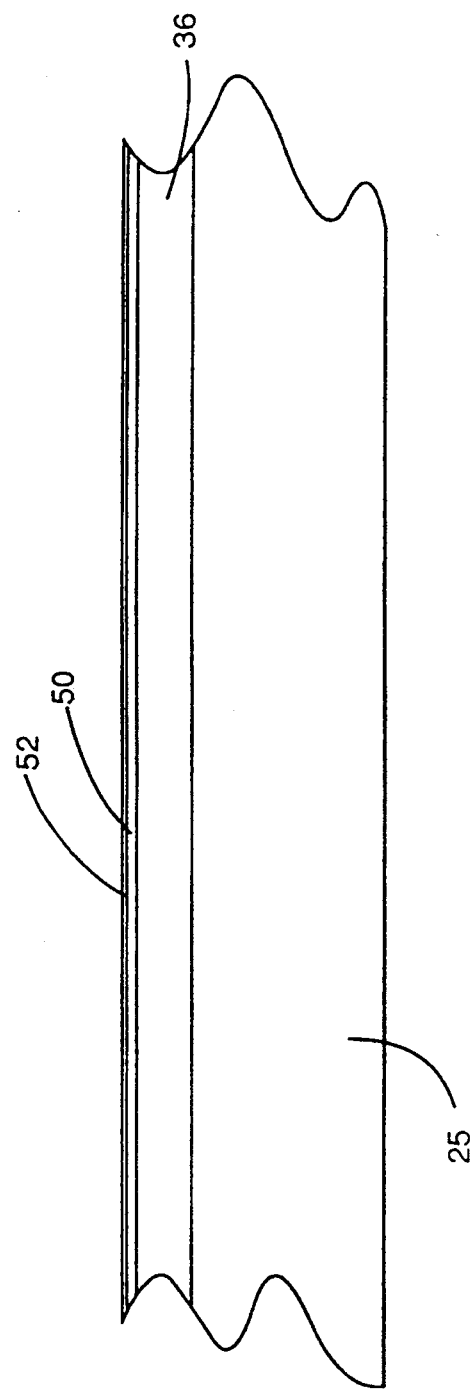
FIG. 10 is a cross sectional view of FIG. 9 including a subsequent lamination layer.
Figure 11:
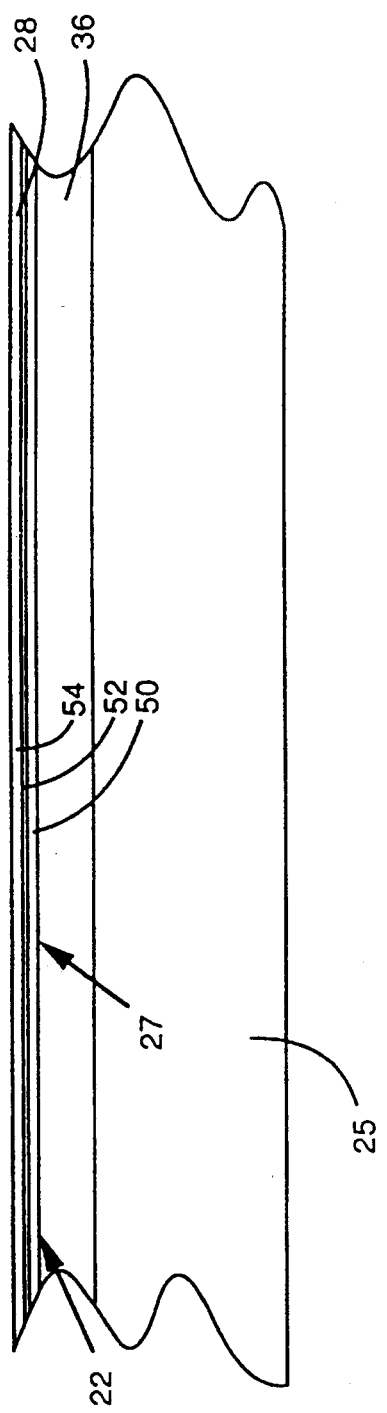
FIG. 11 is a cross sectional view of the structure of FIG. 10 including a subsequent lamination layer.

As shown in FIG. 10, a lower lamination layer 52 has been deposited upon NiFe layer 50 using deposition techniques. Layer 52 is shown thinner than layer 50. Lower lamination layer 52 comprises nickel phosphorus (NIP) in accordance with the present invention. In FIG. 11, nickel iron layer 54 is shown deposited upon NiP layer 52. Layers 50, 52 and 54 form the lower portion of the laminated thin film core of the present invention, including lower pole tip 22, lower pole piece 27 and lower rear portion 28.

Figure 12:
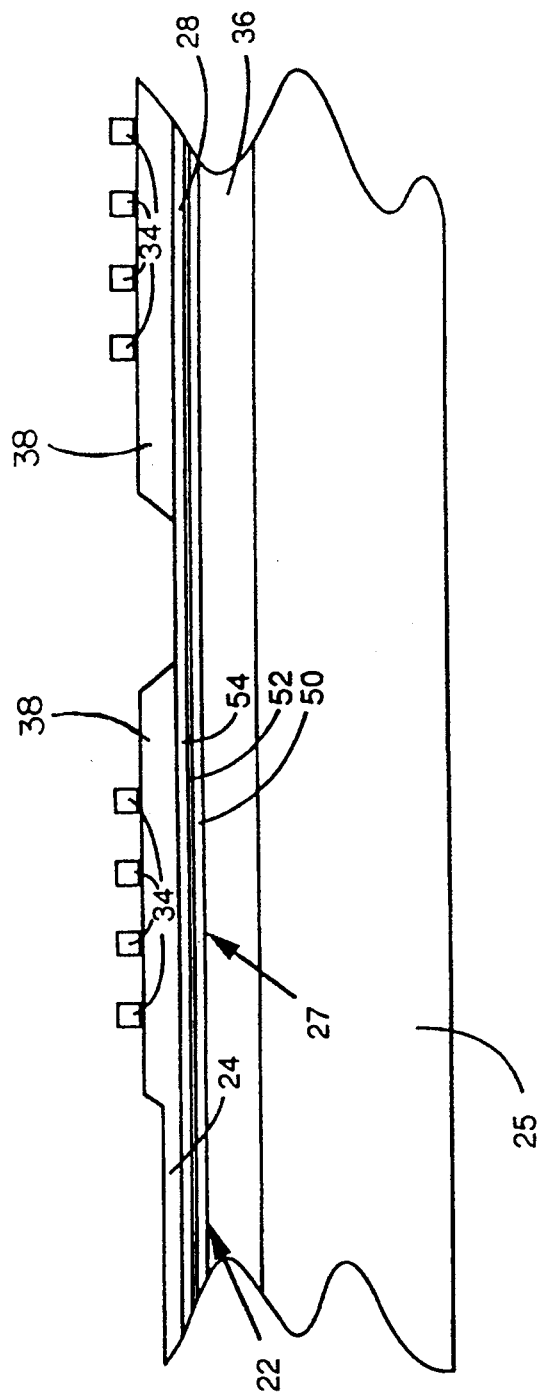
FIGS. 12 and 13 are cross sectional views of the structure of FIG. 11 following deposition of electrical conductors.

Using photolithographic techniques, insulating layer 38 is deposited upon NiFe layer 54 of core 13 in the shape shown in FIG. 12. Alumina ($Al_2O_3$) is deposited in gap 24. Conductors 34 are deposited upon insulating layer 38 and formed in a coiled shape.

Figure 13:
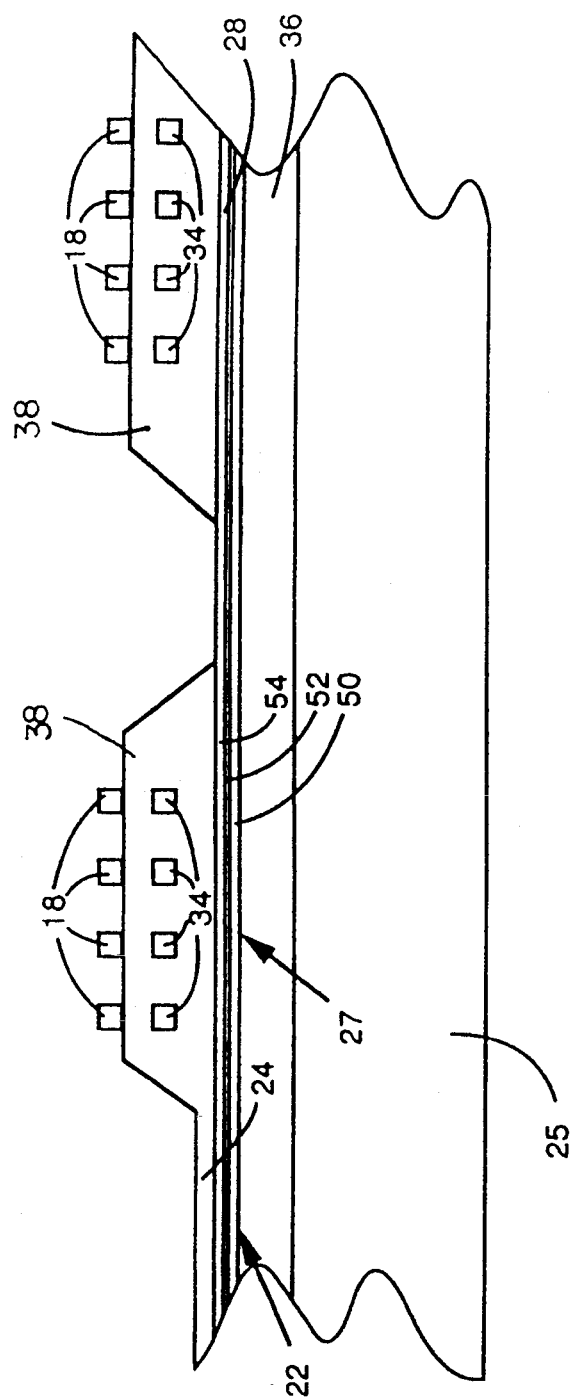

In FIG. 13, insulating layer 38 has been built up slightly using photolithographic masking and etching techniques. Conductors 23 are deposited similar to conductors 34, and formed in a coiled shape.

Figure 14:
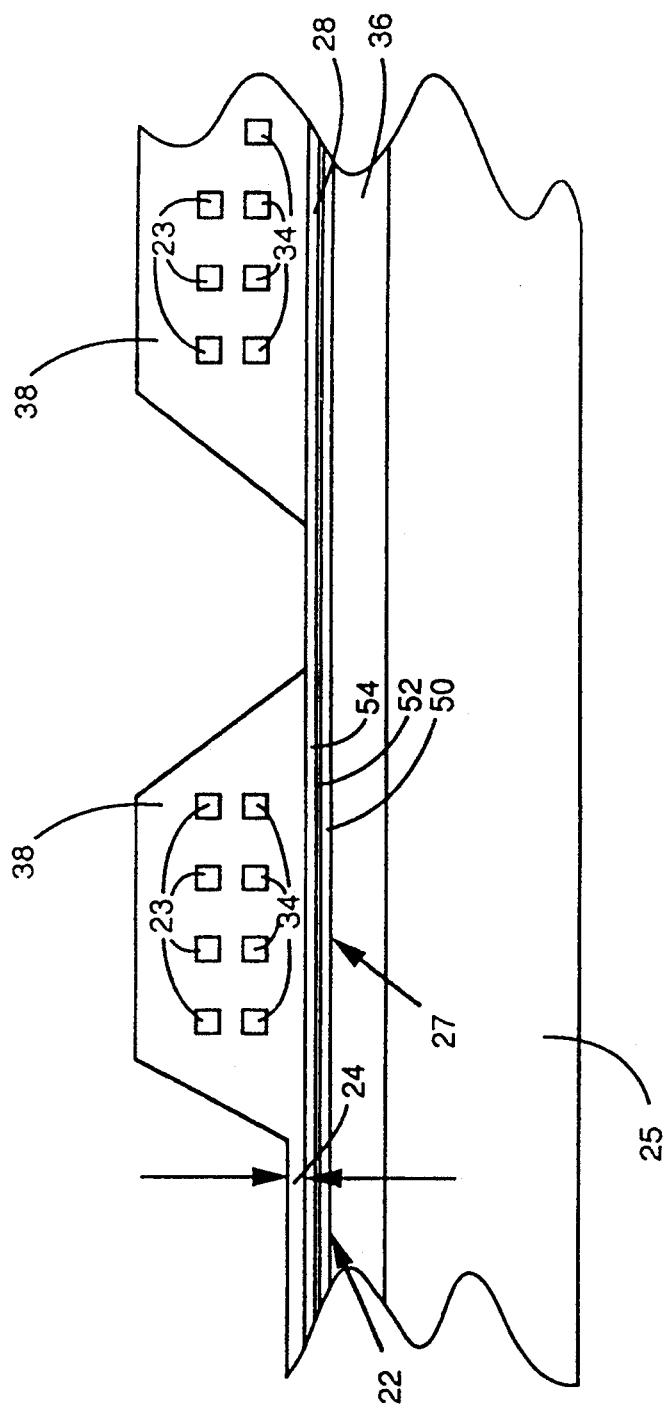
FIG. 14 is a cross sectional view of the structure of FIG. 13 following deposition of insulation layers.
Figure 15:
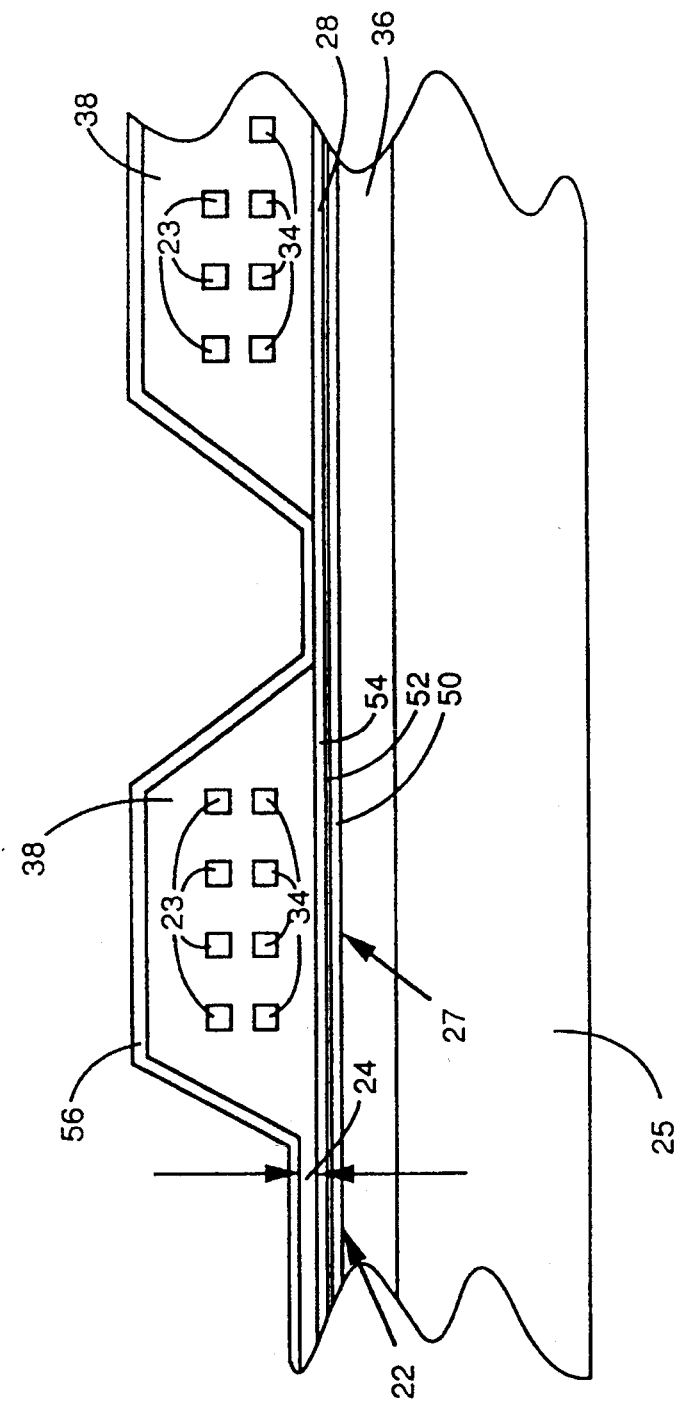
FIG. 15 is a cross sectional view of the structure of FIG. 14 including a lamination layer.

In FIG. 14, insulating layer 38 has been built up using standard deposition techniques and covers conductors 23 and 34. Next, another layer, 56 of magnetic material (NiFe) is deposited over the structure shown in FIG. 14 to form a lamination layer of upper pole piece 21, rear upper portion 26, upper pole tip 20 and a portion of via 30 as shown in FIG. 15.

Figure 16:
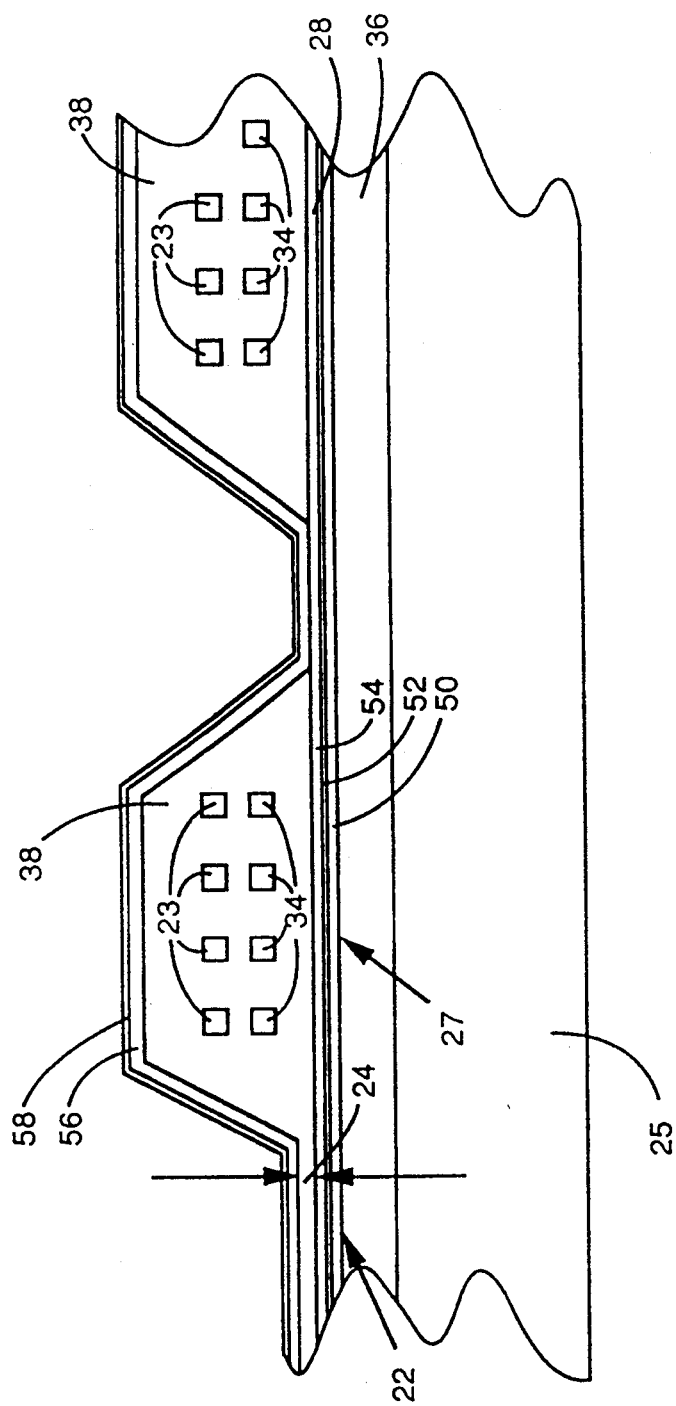
FIG. 16 is a cross sectional view of the structure of FIG. 15 including a subsequent lamination layer.

A nickel phosphorus (NIP) lamination layer 58 is deposited upon nickel iron layer 56 shown in FIG. 16. A final nickel iron lamination layer 60 is deposited upon nickel phosphorus layer 58 to form thin film magnetic head 19 shown in FIG. 6.

Figure 17:
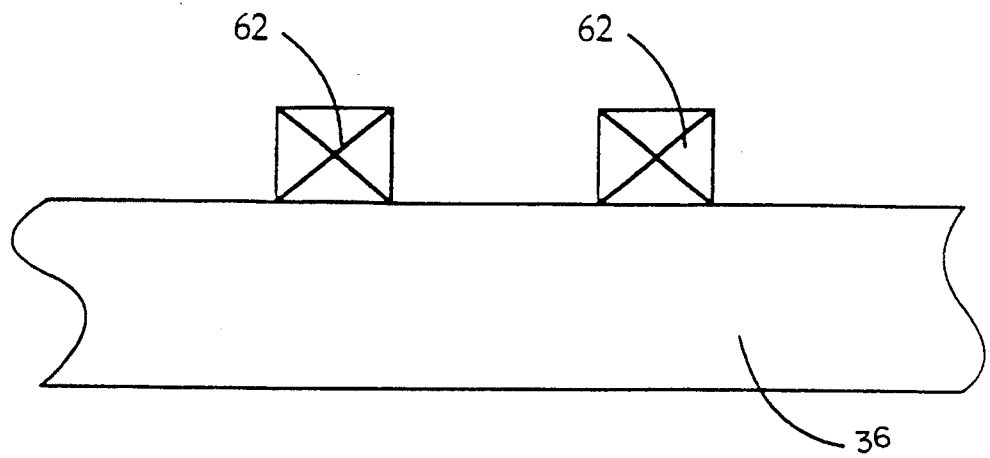
FIG. 17 is a cross sectional view of a substrate including photoresist dams used to form the lower pole tip of FIG. 6.
Figure 18:
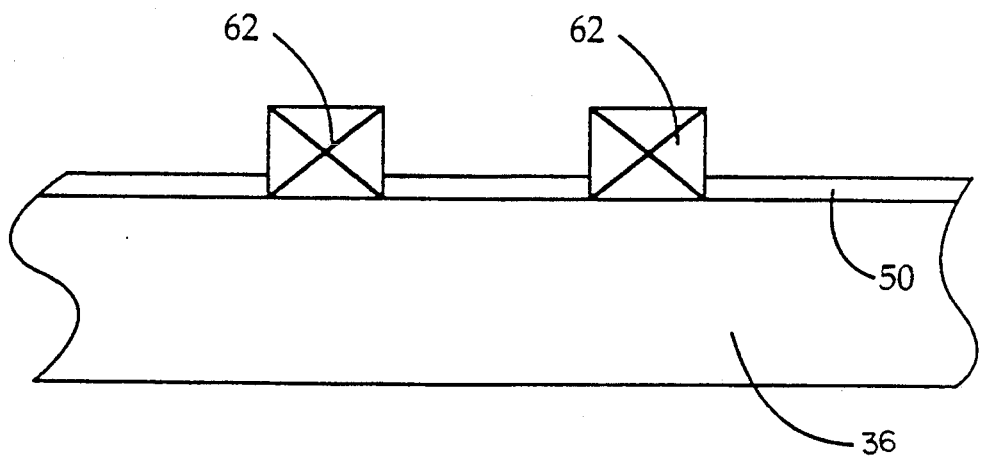
FIG. 18 is a cross sectional view of the structure of FIG. 17 including a lower pole lamination layer.

FIGS. 17–23 show the individual steps used in depositing lower pole tip 22 shown in FIG. 6. These figures are shown as a cross section of the gap region in a direction looking into gap 24. In FIG. 17, two photoresist dams 62 have been deposited upon base coat 36 using standard photoresist deposition techniques. As the layers of the thin film head are deposited, no reaction occurs between dams 62 and the layers. Thus during deposition, the layer only binds with the previously deposited layer, leaving the top and sides of dams 62 exposed. Next, FIG. 18 shows nickel iron (NiFe) layer 50 plated onto base coat 36. FIG. 19 shows the deposited nickel phosphorus (NIP) layer 52. Layers 50 and 52 may be deposited using standard deposition techniques. FIG. 20 shows the lower pole tip 22 following a second nickel iron (NiFe) plating in which nickel iron layer 54 has been deposited. Deposition may be through standard nickel iron deposition techniques.

Figure 21:
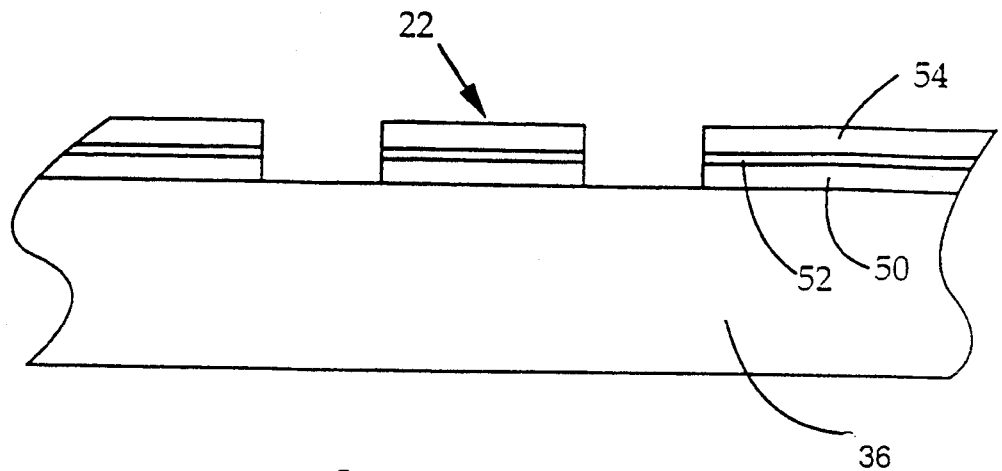
FIG. 21 shows the structure of FIG. 20 following removal of photoresist dams.
Figure 22:
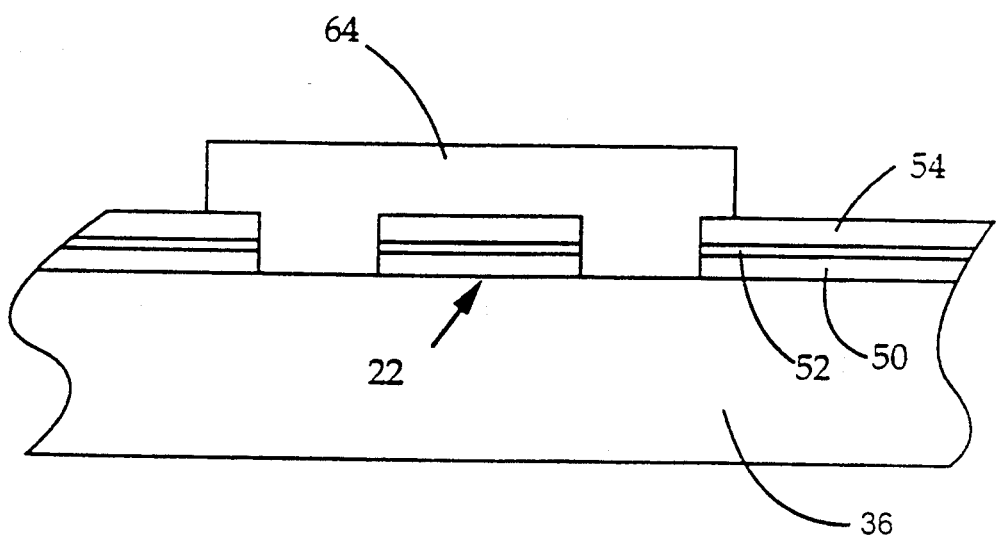
FIG. 22 shows the structure of FIG. 21 following the deposition of photoresist for etching.
Figure 23:
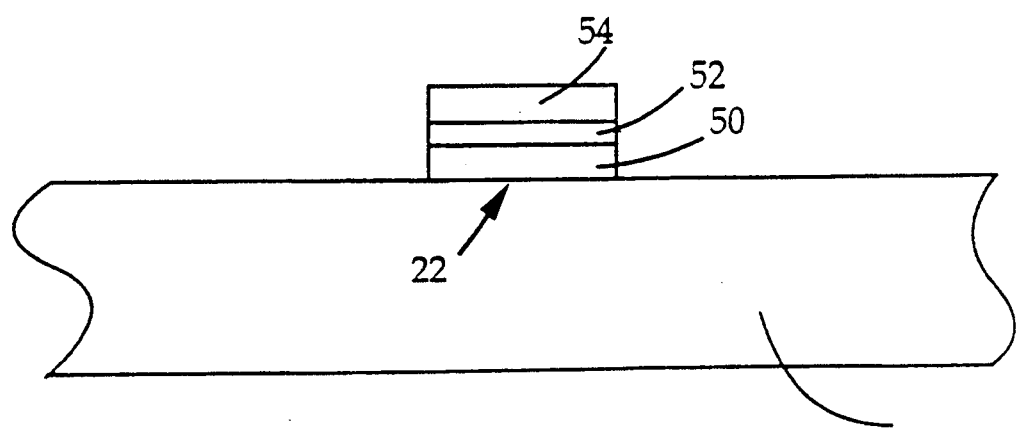
FIG. 23 shows the structure of FIG. 22 following etching and removal of photoresist.

In FIG. 21, the photoresist dams have been stripped leaving the lamination layers behind. A coating of protective photoresist 64 is next deposited as shown in FIG. 22 and covers lower pole tip 22. Photoresist layer 64 may be deposited using standard photoresist deposition techniques. The exposed lamination layers may then be etched leaving behind photoresist 64 and lower pole tip 22. Photoresist 64 may then be stripped as shown in FIG. 23. Using this process, there is no need for changing the mask, and standard nickel iron (NiFe) plating techniques may be used.

The thickness of nickel iron lamination layers 50 and 54 has a useful range between about 200 Angstroms and about 3 microns. The thickness of nickel phosphorus lamination layer 52 has a useful range between about 50 Angstroms and about 500 Angstroms.

The use of two thinner magnetic layers formed by sandwiching a nonmagnetic layer between the two nickel iron layers provides a thin film head having a single magnetic domain such as shown in FIG. 4. The saturation flux density ($4\pi M_s$) remains substantially unaffected in the laminated thin film head as compared to a single layer thin film head. In the present invention, the laminated thin film head core may be deposited using a wet process. A wet process is a process for depositing layers in which a liquid bath is used. The use of a wet process allows the additional steps needed to form the laminated thin film head to be easily integrated into the overall fabrication process which already employs wet processes. A nickel phosphorus (NIP) layer can be electrolessly (i.e. without applying a current) deposited directly upon the nickel iron layer without the additional step of activating the nickel iron layer. Activation is not required because the NiP layer and the nickel iron layer are auto-catalytic. Additionally, the top nickel iron layers in the laminated core can be directly deposited upon the NiP layer through standard electro-deposition techniques. A wet process is used in which a single photoresist mask is used to pattern the entire laminated pole tip in a thin film head as shown in FIGS. 17–23. In addition, because the materials in the lamination are auto-catalytic a catalyzing surface treatment such as $SNCl_2$ is not necessary in the present invention.

In a preferred embodiment of the present invention, the nickel iron lamination layers have substantially zero magnetostriction. A layer having zero magnetostriction is less susceptible to stresses present during the manufacture of thin film heads. The substantially zero magnetostriction nickel iron layers provide the stability needed to maintain a single magnetic domain state in the pole pieces of the present invention. A suitable zero magnetostriction nickel iron layer is 83NiFe17 (i.e. the ratio between nickel and iron is 83:17).

Additionally, multiple lamination layers may be used alternating nickel iron with nickel phosphorus. If multiple laminations are used, two alternative lamination structures are shown in FIGS. 24 and 25. In FIG. 24, each nickel iron lamination layer has a thickness of D while in FIG. 25, the layers on the ends have a thickness of D and the middle layers have a thickness of 2 D. The curved arrows in FIGS. 24 and 25 indicate the magnetic field between lamination layers. The configuration of the lamination layers in FIG. 25 permits the nickel iron (NiFe) layers in the middle of the lamination to contain the magnetic flux path for each of the adjacent nickel iron lamination layers. The nickel iron lamination layers in the lamination structure of FIG. 24, on the other hand, only carry a single magnetic flux path from one adjacent nickel iron layer. See John C. Slonczewski, Bojan Petek and Bernell E. Argyle, and *Micromagnetics of Laminated Permalloy Films*, IEEE Transactions on Magnetics, Vol. 24, No. 3, 2045, 2051–2052 (May 1988).

In operation, magnetic domain closure takes place in the laminated core between two adjacent laminated layers and along the edge of the layers rather than through the closure domains shown in FIG. 4. The reduced number of domains decreases the noise sources present in the laminated thin film head. Nickel phosphorus provides a lamination layer which may be easily integrated into the manufacture of thin film magnetic heads. The layers are auto-catalytic and no activation step is needed during deposition.

Although the present invention has been described with reference to preferred embodiments, workers skilled in the art will recognize that changes may be made in form and detail without departing from the spirit and scope of the invention. For example, the nickel phosphorus lamination layer may comprise NiPX were X is one or more of the following: tungsten, boron, copper or molybdenum.

I claim:

1. In a thin film magnetic transducer having a flux path formed of a first leg and a second leg forming a gap region and a back gap via region, the first leg comprising:
   a first magnetic nickel iron alloy layer;
   a second magnetic nickel iron alloy layer; and
   a nonmagnetic nickel phosphorus alloy layer sandwiched between the first and second magnetic nickel iron alloy layers.

2. The thin film magnetic transducer of claim 1 wherein the first and second magnetic nickel iron alloy layers have substantially zero magnetostriction.

3. The thin film magnetic transducer of claim 1 wherein the nonmagnetic nickel phosphorus alloy layer includes tungsten.

4. The thin film magnetic transducer of claim 1 wherein the nonmagnetic nickel phosphorus alloy layer includes boron.

5. The thin film magnetic transducer of claim 1 wherein the nonmagnetic nickel phosphorus alloy layer includes copper.

6. The thin film magnetic transducer of claim 1 wherein the nonmagnetic nickel phosphorus alloy layer includes copper and tungsten.

7. The thin film magnetic transducer of claim 1 wherein the nonmagnetic nickel phosphorus alloy layer includes copper and boron.

8. The thin film magnetic transducer of claim 1 wherein the nonmagnetic nickel phosphorus alloy layer includes tungsten and boron.

9. The thin film magnetic transducer of claim 1 wherein the nonmagnetic nickel phosphorus alloy layer includes copper, tungsten and boron.

10. The thin film magnetic transducer of claim 1 wherein the nonmagnetic nickel phosphorus alloy layer includes molybdenum.

11. A thin film magnetic transducer comprising:
    a first thin film leg which includes:
       a first magnetic nickel iron layer;
       a second magnetic nickel iron layer; and
       a nonmagnetic nickel phosphorous layer interleaved between the first and second magnetic nickel iron layers; and
    a second thin film leg positioned with respect to the first leg to form a flux path and a magnetic gap.

12. The thin film magnetic transducer of claim 11 wherein the first and second magnetic nickel iron alloy layers have substantially zero magnetostriction.

13. The thin film magnetic transducer of claim 11 wherein the nonmagnetic nickel phosphorus alloy layer includes tungsten.

14. The thin film magnetic transducer of claim 11 wherein the nonmagnetic nickel phosphorus alloy layer includes boron.

15. The thin film magnetic transducer of claim 11 wherein the nonmagnetic nickel phosphorus alloy layer includes copper.

16. The thin film magnetic transducer of claim 11 wherein the nonmagnetic nickel phosphorus alloy layer includes copper and tungsten.

17. The thin film magnetic transducer of claim 11 wherein the nonmagnetic nickel phosphorus alloy layer includes copper and boron.

18. The thin film magnetic transducer of claim 11 wherein the nonmagnetic nickel phosphorus alloy layer includes tungsten and boron.

19. The thin film magnetic transducer of claim 11 wherein the nonmagnetic nickel phosphorus alloy layer includes copper, tungsten and boron.

20. The thin film magnetic transducer of claim 11 wherein the nonmagnetic nickel phosphorus alloy layer includes molybdenum.

* * * * *

UNITED STATES PATENT AND TRADEMARK OFFICE
CERTIFICATE OF CORRECTION

PATENT NO. : 5,379,172
DATED : January 3, 1995
INVENTOR(S) : SIMON H. LIAO

It is certified that error appears in the above-indentified patent and that said Letters Patent is hereby corrected as shown below:

Col. 1, line 51, delete "(NIP)", insert --(NiP)--

Col. 7, line 7, delete "(NIP)", insert --(NiP)--

Col. 7, line 29, delete "(NIP)", insert --(NiP)--

Col. 7, line 46, delete "(NIP)", insert --(NiP)--

Col. 8, line 14, delete "(NIP)", insert --(NiP)--

Signed and Sealed this

Twenty-ninth Day of August, 1995

Attest:

BRUCE LEHMAN

Attesting Officer  Commissioner of Patents and Trademarks